UNITED STATES PATENT OFFICE.

MEDORA AUSTIN FRITZ-WILLIAMS, OF OAKLAND, CALIFORNIA, ASSIGNOR TO MARGARET CROSSE, OF NEW YORK, N. Y.

FOOD.

1,402,347.     Specification of Letters Patent.     Patented Jan. 3, 1922.

No Drawing.     Application filed December 9, 1919. Serial No. 343,602.

*To all whom it may concern:*

Be it known that I, MEDORA AUSTIN FRITZ-WILLIAMS, a citizen of the United States, residing at Oakland, in the county of Alameda and State of California, have invented certain new and useful Improvements in Food, of which the following is a specification.

This invention relates to an improved food product and process of preparing the same. My invention has as its principal object the preparation of a food product of concentrated nature which is not subject to change in texture or composition by the lapse of time and which constitutes a concentrated ration. A further object of the invention is to so prepare the product that the same will keep indefinitely without any protection whatsoever.

The basis of my food product is a dried fruit such as raisins, prunes, apricots, peaches and any other fruit which may be preserved by drying.

The fruit is first ground and then thoroughly mashed, or the grinding and mashing may take place at the same time in a suitably designed machine. The object of this operation is to reduce the mass to a pulp having a minimum amount of fibrous matter and to thoroughly incorporate the various parts of the fruit into a uniform mass.

To more thoroughly accomplish this result I allow the ground mass to stand from six to eight hours and then subject it to a second grinding and mashing. The time element between successive grindings is an important factor as it allows a blending of the natural oils and sugars of the fruit which improves the taste and keeping qualities of the resultant product.

After a second like interval I again grind and mash the mass and then again allow it to stand several hours, at the end of which time I knead the mass, preferably at a low temperature. The principal object of the kneading is to compact the mass and exclude as much air as possible therefrom. During the kneading operation of some fruits I incorporate a small amount of a non-drying vegetable oil such as olive oil which further prevents the drying out of the finished mass.

If the fruit used is lacking in natural sugar I supply the deficiency by adding at any stage of the process a certain amount of invert sugar generally in the form of honey. If raisins are used they contain a sufficient amount of invert sugar or glucose and levulose and it is sometimes necessary to add water to dissolve the sugar which may have crystallized.

The carrying out of my process involves the complete breaking down of the cells of the fruit in which the natural oils and saccharine products are contained and the thorough incorporation of these ingredients throughout the mass of pulp. The oil and saccharine products in the form of invert sugar or glucose and levulose are both slow to solidify so that my compound will keep for years and maintain a uniform texture and consistency.

In forming the product under the process I use to each 100 pounds of raisins about 1 ounce of water although the amount of the latter will depend upon the amount of natural moisture in the raisin. The amount of oil used does not exceed one ounce per 100 pounds of fruit and I generally use olive or cottonseed oil.

Making allowance for the water in the fruit I endeavor to obtain a product containing 65 to 75 per cent invert sugar, 20 to 30 per cent water, 4 to 7 per cent fiber and pulp and about 1 to 3 per cent oil or fat.

Having thus described my improved compound and process, I claim as new and wish to cover by letters patent:—

1. The process of preparing a food product consisting in grinding and mashing a dried fruit with a syrupy saccharine product, kneading the mass to exclude air, and incorporating therein a non-drying vegetable oil to form a homogeneous non-porous mass.

2. The process of preparing a food product consisting in grinding and mashing a dried fruit, adding moisture and invert sugar to give the mass a predetermined composition, and kneading the mass with a non-drying vegetable oil to form a non-porous mass.

3. A food product consisting of ground fruit, glucose, levulose, and a small quantity of non-drying vegetable oil.

4. A food product consisting of fruit pulp, invert sugar, moisture, and a small quantity of non-drying vegetable oil.

5. A food product consisting of fruit pulp 4 to 7 per cent, moisture 20 to 30 per cent, invert sugar 65 to 75 per cent, and a non-drying vegetable oil, 1 to 3 per cent.

In testimony whereof I affix my signature.

MEDORA AUSTIN FRITZ-WILLIAMS.